US009424596B2

(12) United States Patent
Bruce et al.

(10) Patent No.: US 9,424,596 B2
(45) Date of Patent: *Aug. 23, 2016

(54) METHOD AND SYSTEM FOR IMPLEMENTING A VIRTUAL GAME

(71) Applicant: ZYLO MEDIA, LLC, Portland, ME (US)

(72) Inventors: Robert Bruce, Portland, ME (US); Colin Snyder, Portland, ME (US)

(73) Assignee: ZYLO MEDIA, LLC, Portland, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,233

(22) Filed: Dec. 3, 2013

(65) Prior Publication Data

US 2014/0188625 A1   Jul. 3, 2014

Related U.S. Application Data

(63) Continuation of application No. 12/484,006, filed on Jun. 12, 2009, now Pat. No. 8,597,117.

(60) Provisional application No. 61/186,501, filed on Jun. 12, 2009, provisional application No. 61/131,767, filed on Jun. 12, 2008.

(51) Int. Cl.
| *A63F 9/24* | (2006.01) |
| *A63F 13/00* | (2014.01) |
| *G06F 17/00* | (2006.01) |
| *G06F 19/00* | (2011.01) |

(Continued)

(52) U.S. Cl.
CPC ............ *G06Q 30/0269* (2013.01); *G06Q 30/02* (2013.01); *G07F 17/32* (2013.01)

(58) Field of Classification Search
USPC ...................................................... 463/25, 29
See application file for complete search history.

(56) References Cited

U.S. PATENT DOCUMENTS

| 5,092,598 A | 3/1992 | Kamille |
| 5,511,781 A | 4/1996 | Wood et al. |

(Continued)

FOREIGN PATENT DOCUMENTS

| WO | 0188822 A1 | 11/2001 |
| WO | 0213931 A2 | 2/2002 |

OTHER PUBLICATIONS

The Silber Law Firm, Games of CHance—a Risky Proposition, 2006, www.thesilberlawfirm.com/pdfarticles/Games_of_Change.pdf.

*Primary Examiner* — Kevin Y Kim
(74) *Attorney, Agent, or Firm* — Lando & Anastasi, LLP

(57) ABSTRACT

The computer-implemented virtual game-based method and system of the present invention allow participants to play incentive-based virtual games and accept or decline offered prizes. Declining an offered prize allows a participant to play for a more desirable price and accepting a prize prohibits the participant from accepting another prize for the duration of a temporal lock out period. Individual single use virtual games are issued electronically to participants requesting to play a virtual game. Prizes are offered by each single use virtual game in accordance with pre-generated single use virtual game tickets commanding the presentation of an offered prize or non-offered prize. Some embodiments of the present invention deliver branded advertising to consumers participating in game play. In these embodiments, virtual game elements comprise branded advertising impressions as part of the interactive virtual game.

20 Claims, 5 Drawing Sheets

(51) Int. Cl.
    *G06Q 30/02*     (2012.01)
    *G07F 17/32*     (2006.01)

(56) References Cited

U.S. PATENT DOCUMENTS

| | | | |
|---|---|---|---|
| 5,855,369 | A | 1/1999 | Lieberman |
| 6,173,267 | B1 | 1/2001 | Cairns |
| 6,237,913 | B1 | 5/2001 | Kamille |
| 6,375,187 | B1 | 4/2002 | Baerlocher |
| 6,409,593 | B1 | 6/2002 | Petrecca |
| 6,454,650 | B1 | 9/2002 | Aronin |
| 6,488,280 | B1 | 12/2002 | Katz et al. |
| 6,628,939 | B2 | 9/2003 | Paulsen |
| 6,811,484 | B2 | 11/2004 | Katz et al. |
| 7,008,318 | B2 | 3/2006 | Schneier et al. |
| 7,052,010 | B2 | 5/2006 | Katz et al. |
| 8,597,117 | B2 | 12/2013 | Bruce et al. |
| 2001/0034643 | A1 | 10/2001 | Acres |
| 2002/0103022 | A1 | 8/2002 | Somol et al. |
| 2002/0128057 | A1 | 9/2002 | Walker et al. |
| 2003/0157977 | A1 | 8/2003 | Thomas et al. |
| 2007/0105617 | A1 | 5/2007 | Walker et al. |
| 2007/0265060 | A1 | 11/2007 | Hornik et al. |
| 2010/0016083 | A1 | 1/2010 | Bruce |

METHOD AND SYSTEM FOR IMPLEMENTING A VIRTUAL GAME

CROSS-REFERENCE TO RELATED APPLICATION

This application is a continuation of and claims priority under 35 U.S.C. §120 to U.S. patent application Ser. No. 12/484,006 entitled "METHOD AND SYSTEM FOR IMPLEMENTING A VIRTUAL GAME" filed on Jun. 12, 2009, which claims priority to U.S. Provisional Application No. 61/131,767 entitled COMPUTER IMPLEMENTED GAME OF CHANCE, filed on Jun. 12, 2008, and to U.S. Provisional Application No. 61/186,501 entitled COMPUTER IMPLEMENTED GAME, filed on Jun. 12, 2009, each of which applications the entire content of which is incorporated herein by reference.

BACKGROUND

1. Field of the Invention

The present invention relates generally to the field of generating prize-based virtual games for distribution through a computer network. More particularly, this invention relates to methods and systems for implementing virtual games wherein a participant playing a virtual game may forgo accepting an offered prize in lieu of playing the game again, and wherein the participant is prohibited from playing to win another prize for a predetermined period following acceptance of an offered prize.

2. Discussion of Background Information

Computer networks are commonly used to enable one or more users to participate in entertainment activities, including games of skill and games of chance. These games may not require the participant to pay anything to play, or they may require the purchase of software or other payment in order for the participant to play. Certain of the games offer a participant the opportunity to win prizes based upon the outcome of their play. Generally, games of chance that allow a participant to win prizes require no payment to play and are structured as sweepstakes. A sweepstakes style game usually comprises a simple process, whereby the participant takes an action such as submitting an entry or playing a short game, and the action results in a random determination of whether the user did or did not win a prize.

Computer implemented games are an extremely popular form of entertainment, and advertisers often pay to insert images of their branded products and services in order to build brand recognition and increase revenue. Some computer implemented games offer prizes, and advertisers or sponsors often provide those prizes. Sponsored prizes offered by participating advertisers or sponsors typically comprise branded elements, and sometimes the branded elements appear within static displays or dynamic "pop up" advertisements accompanying a game. Typically, these displays appear once, and a participant either wins or loses the game, thereby terminating the game and limiting number of viewable impressions of a branded advertisement. Additionally, static and pop-up advertisements are easily ignored or overlooked entirely as distracting to the process of playing the game.

A game offering a prize of value provides some incentive for a participant to continue playing, thereby increasing opportunities for displaying one or more branded advertisements. With regard to typical on-line games, however, participants typically win prizes of value infrequently and/or must pay to play, both of which characteristics discourage high volume participation. This diminished participation rate reduces opportunities for high volume advertising. Furthermore, limited prize offerings reduce opportunities to collect valuable product preference data. A participant who wins a game and accepts an associated prize may continue playing for an additional prize, thereby monopolizing the game and the availability of sponsored prizes in the pool of prizes provided to incentivize high volume participation. Additionally, when a participant wins a game, a prize is offered so that a participant is left with only the options of accepting the prize or terminating play. These games often offer no option for forgoing acceptance of a prize in favor of continuing to play in hopes of winning a more desirable prize. This too limits opportunities for collecting valuable data associated with a brand or product or service associated with a plurality of sponsored prizes.

The net result of these inadequacies of existing games is loss of valuable advertising revenue associated with acknowledged impressions of a branded product or service and loss of preference data associated with high volume participation and participant selections. For these reasons, a need exists for systems and methods for distributing interactive, high volume branded advertising within a prize-incentivized virtual game-based format that encourages participation from a high volume of participants who provide valuable preference data by selecting particular sponsored prizes in lieu of accepting any alternatively offered prize for a specified period of time.

SUMMARY OF THE INVENTION

The present invention provides a novel computer implemented methods for generating games for entertaining a user and computer systems and software for carrying out the same. The methods and systems of the present invention overcome many of the limitations of prior art computer-implemented games. According to the present invention, if the game participant is offered a prize, he or she is presented with the choice of accepting or rejecting the prize. If the participant accepts the prize, the participant is awarded the prize and restricted from accepting prizes for some period of time. If the participant rejects the prize, the participant is permitted to continue game play in hopes of obtaining a more desired prize in future iterations of the game. Preferably the participant does not pay anything of value to participate in the game.

Accordingly, the present invention, in one exemplary embodiment, provides a computer implemented method for generating a game comprising the steps of receiving a request from a participant terminal to participate in a game. In response to receiving the request to participate in a game, enabling game play at the participant terminal; determining the game outcome; and revealing at the participant terminal whether the determined outcome is a winning game outcome. If the outcome is a winning outcome, the participant is offered a prize and the choice to accept the prize. If the participant accepts the prize, the participant is subject to a temporal lock out.

In one embodiment, the present invention is directed to a system and method for distributing interactive, high volume branded advertising within a prize-incentivized virtual game-based format. The interactive games generated by the present invention encourage participation by a high volume of participants who provide valuable preference data by selecting particular sponsored prizes in lieu of accepting any other prize for a specified period of time. The system may offer many prizes to a participant who may pass on prizes and continue playing and engaging with visible advertisement impressions until receipt of a desired prize. Once a participant accepts an offered prize, the system prevents that player from accepting another prize for a period of time, thereby establishing a lockout period that discourages players from accepting every offered prize. This incentive to play repeatedly in hopes of receiving a desired prize increases opportunities for displaying impressions of branded items and services.

In one embodiment, the present invention comprises a computer-implemented method for generating a prize-incentivized interactive game. The method comprises providing game play server in communication with a computer network, and the game play server comprises a processor portion and a memory portion. The memory portion has stored thereon a set of executable steps adapted for execution by the processor portion. The executable steps comprise receiving a request to participate in a game play session from a participant terminal, wherein the participant terminal is in communication with the computer network. In response to the request, the executable steps comprise instructing the processor portion to generate a game for display at the participant terminal. In one outcome, the game corresponds with an offer type virtual game ticket having an offered prize associated therewith. The game displays one or more selectable choices, wherein one choice is to accept the offered prize and thereby prohibit subsequent acceptance of a prize for a predetermined period of time. In another outcome, the game corresponds with a non-offer type virtual game ticket having no offered prize associated therewith thereby presenting no prize-related prohibition to subsequent acceptance of a prize. The executable steps further comprise instructing the game play server to transmit the generated game for display at the participant terminal.

As indicated above, in some embodiments, the generated game may comprise branded advertising impressions inserted as elements of the game. The branded advertising impressions may represent an offered prize and potential future prize offerings. The potential future prize offerings incentivize a participant to decline an offered prize in favor of continuing to play subsequent virtual games in the hope of receiving an offer for a more desirable and/or valuable prize.

The present invention also comprises a system for executing the embodiments of the method of the present invention. One embodiment of the system for generating an interactive virtual game comprises a game play server in communication with a computer network. The game play server comprises a processor portion and a memory portion, and the memory portion has stored thereon a set of executable steps adapted for execution by the processor portion. The executable steps comprise receiving a request to participate in a virtual game from a participant terminal, wherein the participant terminal is in communication with the computer network, and wherein one or more specified prizes are provided during the virtual game session by one or more advertisers. The virtual game session comprises a predetermined number of virtual games, each virtual game comprising a graphical representation of a virtual game with one or more game elements of the graphical representation comprising branded advertising.

The executable steps stored on the memory portion further comprise instructing the processor portion to generate a virtual game for display on a graphical participant interface of the participant terminal in response to the request to participate in the virtual game session and instructing the game play server to transmit the generated interactive virtual game for display at the participant terminal. The virtual game is either a pre-determined winning virtual game offering a sponsored prize or a pre-determined non-winning virtual game. A participant receiving a non-winning virtual game can redeem the non-winning virtual game for a new virtual game, and a participant receiving a winning virtual game can accept the sponsored prize or decline the sponsored prize. Acceptance of the sponsored prize triggers a temporal lockout prohibiting the participant from accepting another prize for a period of time. The declination of a sponsored prize from a winning virtual game results in no temporal lockout.

In another embodiment, the system further comprises an advertiser database in communication with the computer network. The advertiser database stores advertiser identification information for one or more participating advertisers and game elements representing one or more sponsored prizes associated with each advertiser for selective retrieval by the game play server during the step of generating a virtual game for display at the participant terminal.

DETAILED DESCRIPTION

The present invention resolves the stated deficiencies of typical interactive gaming systems and methods. In one embodiment the present invention provides a game in which a user participates to obtain a prize. The prize may be of nominal or substantial value and may include, for example, a good or service, or a provision of a purchase discount or coupon. When presented with the prize, the participant must choose whether to accept the prize and be restricted from accepting prizes in future iterations of the game for a period of time or from participating in game play for a period of time, or decline the prize and continue participating in further iterations of the game in the hope of obtaining a different result.

In another embodiment, the system and method of the present invention distribute interactive, high volume branded advertising within a prize-incentivized virtual game-based format. The interactive games generated by the present invention encourage participation by a high volume of participants who provide valuable preference data by selecting particular sponsored prizes in lieu of continuing to play for alternative prizes for a specified period of time. The system may offer many prizes to a participant who declines accepting those prizes and continues playing and engaging with visible advertisement impressions until the system offers a desired prize. Once a participant accepts an offered prize, the system prevents that player from accepting another prize for a period of time, thereby establishing a lockout period that discourages players from accepting every offered prize. This incentive to play repeatedly increases opportunities for displaying impressions of branded items and services.

Figure 1:
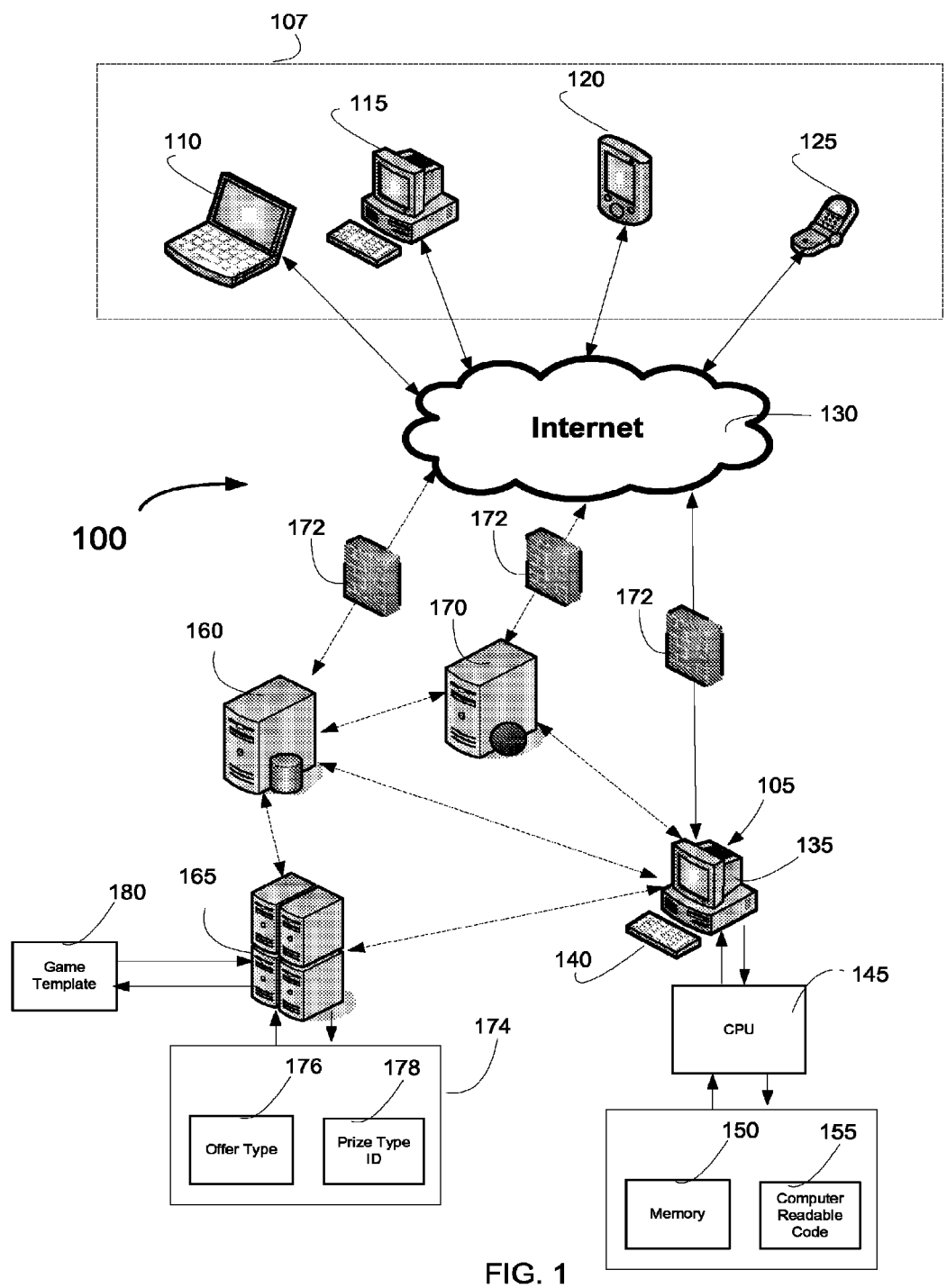
FIG. 1 is a schematic showing an overview of an embodiment of the system of the present invention.

FIG. 1 depicts an overview of the game system 100 of the present invention. This system includes a game terminal 105 in communication with a plurality of participant terminals 107 that are communicating through a computer network. Because the present invention is available on a global level, and because the Internet 130 is a global electronic communications network linking private and public networks and computers, the Internet 130 is an appropriate medium for facilitating the present invention. The plurality of participant terminals 107 are preferably devices capable of communicating with the Internet 130 through wired or wireless means, devices for example such as a laptop computer 110, a stationary computer 115, a personal computing device (PCD) 120, and a cellular telephone 125.

In one embodiment, the game terminal 105 is a computer that comprises elements typical of a computing system. These elements include items such as a monitor 135, a keyboard 140, a processor such as a central processing unit (CPU) 145, and a memory storage area 150. The memory storage area 150 may be random access memory (RAM), or a combination of RAM and some removable memory storage means such as floppy disk, EPROMs, PROMs, or USB storage devices. The memory storage area 150 contains executable computer readable code, or software 155, for executing the present invention. In an alternative embodiment, the memory storage area 150 may be a database server 160 for an added level of security and more expansive storage capacity. In an alternative embodiment, the game terminal 105 optionally also may communicate with an application server 165 that stores and executes the software 155 and with a web server 170 that hosts an interactive website. One skilled in the art will understand that these hardware elements are depicted by way of example only and that any combination of computing elements may execute the present invention. For example, the CPU 145 and memory storage area 150 of the game terminal 105 may be embodied on a server and multiple databases may exist on that same server instead of as one or more independent database servers 160.

Firewalls 172 optionally may exist between the game terminal 105 and the Internet 130 or between any of the servers 160, 165, 170 and the Internet 130. Bi-directional routers (not shown) also may be disposed between each of the plurality of participant terminals 107 and the Internet 130, and between the Internet 130 and the game terminal 105. Additionally the laptop computer 110, stationary computer 115, PCD 120, and cellular telephone 125 are shown by way of example only and an unlimited number of participant terminals 107 may communicate with the game terminal 105.

Figure 2:
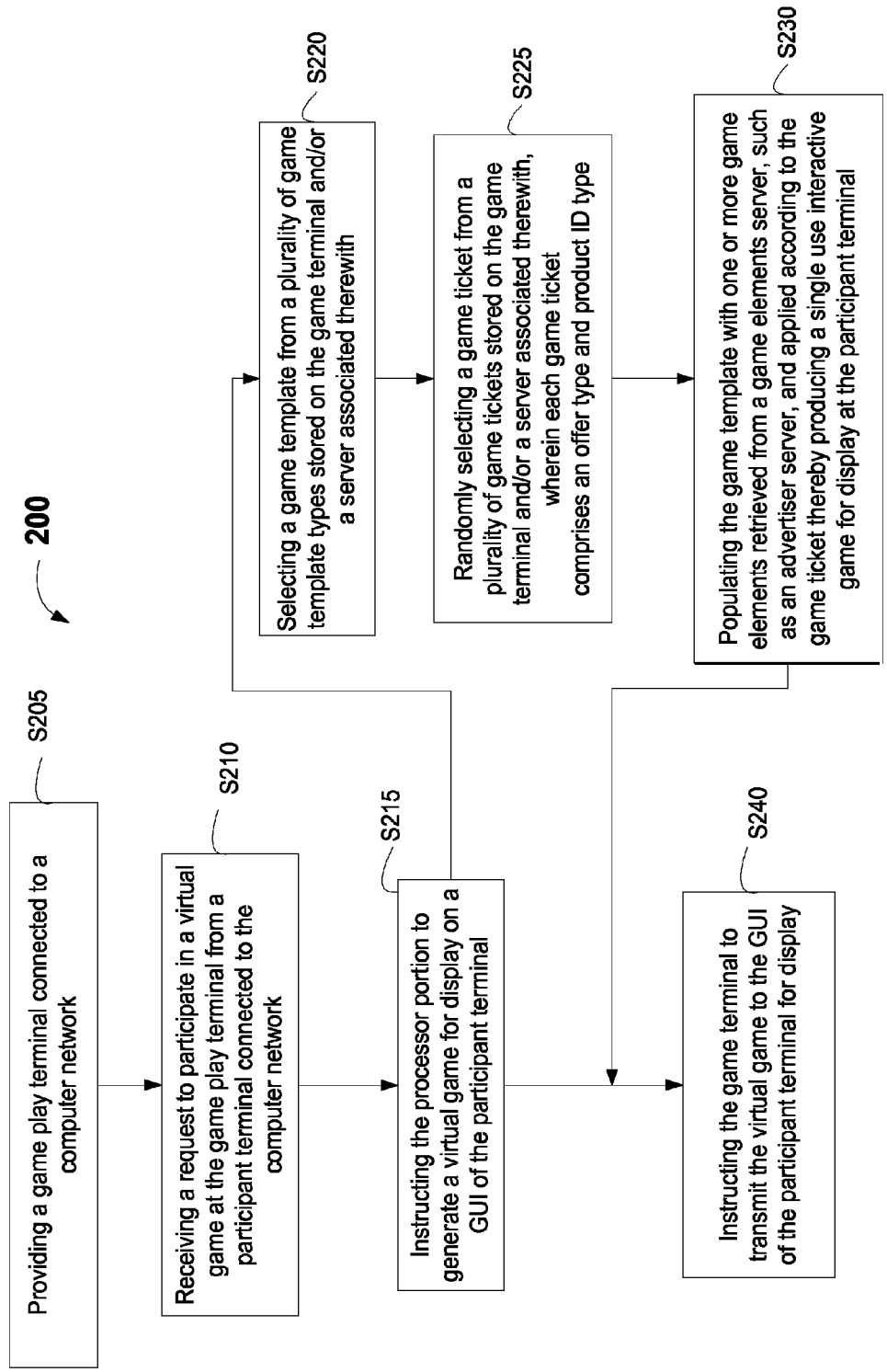
FIG. 2 is a schematic showing an embodiment of the method of the present invention.

Taking FIGS. 1 and 2 together, one embodiment of a computer-implemented virtual game-based method 200 of the present invention comprises several steps involving components of the game system 100. A first step S205 to providing an interactive virtual game comprises providing the game terminal 105, which, in one embodiment, is a game server in communication with a computer network, such as the Internet 130. The game terminal 105 hosts the software 155, the set of executable steps, that instructs portions of the system 100 and data structures stored thereon to interact and produce an interactive virtual game for display at a user terminal 107. In one embodiment, the game terminal 105 serves the virtual game, and in an alternate embodiment, the game terminal 105 serves a standalone script to a user terminal 107. In another embodiment a participant may download the software 155 to the participant terminal 107 from the game play server and/or game terminal 105. A participant may access the interactive website hosted by the web server 170, for example, and download some or all of the software 155 over the computer network, e.g. the Internet 130, to the participant terminal 107. The downloaded software 155 will execute on the participant terminal 107 and will instruct the processor of the participant terminal 107 to retrieve data from the components of the system 100 and generate a virtual game. In yet another embodiment, portions of the software 155 generating a virtual game may execute at the game terminal 105 and portions may execute on a processor of the participant terminal 107. In another embodiment, the participant may acquire the software 155 from a transferable medium from which the software 155 is uploaded onto the participant terminal 107.

Returning to the method of FIG. 2, the software 155 executes a second step S210 of receiving a request at the game terminal 105 from a participant terminal 107 also in communication with the computer network, wherein the request is to participate in a virtual game such as a game of skill or a game of chance. A game of skill may be, for example, a crossword puzzle, a trivia game, a logic game or a game requiring physical interaction with a bio-feedback controller, such as a golfing game responsive to a handheld biofeedback wand simulating interaction with a golf club. Games of skill require a high level of participant interaction and a successful outcome of game play is determined by the skill level of the participant. In one embodiment, losing at a game of skill automatically issues an instruction to decline acceptance of a prize that otherwise would be offered in that iteration of game play. A game of chance may be, for example, a video slot machine game or a tic-tac-toe style matching game. Success of winning at a game of chance is independent of the participant's skill level. The virtual game may be a sweepstakes, requiring no fee payment as entry to participate in game play or the virtual game may require that a participant pay a fee to play.

When the game being requested is a game of chance, the outcome may be predetermined by the game terminal 105. In such embodiments the participant is essentially requesting outcomes from the game terminal 105, and the game terminal 105 transmits the outcomes over the computer network to the participant terminal 107. When the game being requested is a game of skill, the outcome may be determined in-part by the skill of the participant. In such embodiments, based upon the skill of participant the game terminal 105 generates an outcome and transmits that outcome to the participant terminal 107 via a computer network. In both games of chance and games of skill, where the outcome of the game is an "offer" or the game is a winning game, the participant is offered a prize and given the choice to accept the prize. If the participant accepts the prize, the participant is prohibited from accepting prizes in future iterations of the game for a period of time or prohibited from participating in future iterations of the game for a period of time.

In still other embodiments game play may comprise a game that is a combination of skill and chance. For example, if a goal or score must be met to win prize, then the specific prize is awarded every "n" number of games in which the specific prize goal was met. The specific prize goal may be met by skill of the participant during a game (e.g., hitting a specific target or getting a certain score) as well as by random chance (e.g., a 10% chance each time a certain target is hit or a certain score is obtained the user is awarded a prize). In such embodiments, based upon input on input from the participant, an outcome is determined. If the outcome is a winning outcome, an offer game ticket is generated or pulled from the queue of pre-generated game tickets 174 and the participant is offered the prize associated with that game ticket 174. If the participant accepts the prize, the participant is subjected to a temporal lockout.

Each virtual game comprises a graphical representation with one or more game elements. In one embodiment, the one or more game elements 185 comprise one or more branded advertising impressions, defined as an appearance of a product or service being advertised. Once the CPU 145 receives a request from a participant terminal 107 to participate in a game session by playing a virtual game, a third step S215 comprises instructing the CPU 145 to generate a virtual game for display on a GUI of a participant terminal 107. A final step S240 comprises instructing the game terminal 105 to transmit the interactive virtual game to the GUI of the participant terminal 107 for display.

The virtual game is either a winning game that will offer a prize, or a non-winning game that presents no offered prize. In one embodiment, the prizes are sponsored by advertisers desiring propagation of virtual impressions of their branded goods and services. A participant receiving a non-winning virtual game at the participant terminal 107 can request to play a new game. In one embodiment, this request may be affected by redeeming the non-winning virtual game for a new virtual game. A participant receiving a winning virtual game at the participant terminal 107 can accept the prize or decline the prize. In one embodiment, the acceptance of the prize triggers a temporal lockout that prohibits the participant from accepting another prize for a predetermined period. The pre-determined period may represent, for example, a pre-set period of time associated with the value of the accepted prize and/or may represent a number of subsequent rounds of game play. Allowing or requiring a participant to continue playing without taking a prize thereby increases the number of opportunities to display marketing impressions, i.e. the number of opportunities for advertisers to display their branded products and/or services. In another embodiment, accepting a prize may prohibit the participant from further game play for a pre-set period of time associated with the value of the accepted prize and/or may represent a number of subsequent rounds of game play or subsequent number of prizes accepted by other participants.

In certain embodiments the period of time a participant is prohibited from participating in game play upon accepting a prize may be related to the accepted prize or a participant's past performance. For example, in one embodiment the period of time the participant is prohibited from participating in game play or accepting a prize is proportional to the monetary value of the prize accepted, i.e., the greater the monetary value of the prize, the greater the period of time the participant is prohibited from participating in game play. In another embodiment the period of time the participant is prohibited from participating in game play or accepting a prize is related to a participant's past performance. For example, the time period may be related to the monetary value of prizes accepted by a participant over a given time period; if a participant accepts $100 in prizes in a one month period, the participant is thereafter prohibited from participating in the game of chance for one week, however, if a participant a participant accepts $500 in prizes in a one month period, the participant is thereafter prohibited from participating in game play for one month. In other embodiments the period of time may be defined in terms of the number of game plays. For example, where the participant accepts a prize the user may be prohibited from accepting another prize until he or she has participated in 20 additional iterations of the game. In other embodiments the participant may be prohibited from participating in game play or accepting a prize for until the participant takes some action. For example, the participant may be prohibited from participating in game play or accepting a prize until he or she completes a task such as redeeming a coupon or gift certificate that he or she accepted. In another embodiment the game play terminal 105 randomly assigns a lock out period to an offered prize and a participant may want to accept the prize but with a shortened lockout period. The participant may then bid for a shorter lock out period and depending on an independent predetermined probability, the game system 105 will either accept that bid or withdraw the offer for the prize.

In any embodiment, the system 100 recognizes participants and stores identification data associated therewith in a participant registry, which may be stored on the database server 160 or in the memory portion 150 of the game terminal 105, for example. Participants may be recognizable by data, such as cookies and/or MAC address, stored on their participant terminals 107, and/or the system may require that participants register their identification information, such as a username and password, with a participant registry stored on the database server 160 or in the memory portion 150 of the game terminal 105. The participant registry also may store other useful participant attributes and demographic information such as age, gender and geographic location, all of which may provide valuable information to advertisers analyzing participant choices with regard to offered and accepted (and/or declined) prizes. A player may accept a prize offered by the virtual game by, for example, aligning a cursor with an interactive field on the virtual game displayed at the user terminal and executing a mouse click to instruct the software 155 to record the user selection. This selection data is then registered in connection with the participant identification along with an indicator triggering a temporal lockout period.

In embodiments requiring a participant to register with the system 100, the registration process may request personal information from the participant such as gender, age and geographical location. In certain embodiments, the system 100 may use the registration information to select prizes to present to the participant. In still other embodiments, when a participant is required to register prior to participation, the registration may include a selection of a class of category of prizes preferred by the participant. For example, in one embodiment, when registering a participant may select prize preferences relating to a class of travel and specifically a preferred category of hotel stays or airline tickets. Thereafter, the prizes presented to the participant will be related to the selected preferences. In still other embodiments registration may require the participant to provide personal information, create a participant name, and a password.

In those embodiments requiring the participant to register, once the participant has registered with the game system 100, the participant is assigned a unique participant ID and password, which the participant subsequently uses to log onto the game system 100 to request a game. Once the participant logs onto the game system 100 the participant may be presented with a plurality of games from which to select. The games may include games of chance, games of skill, or some combination thereof.

One or more specified prizes are provided during a game play session by one or more advertisers or sponsors. The game play session comprises a predetermined number of virtual games and/or a predetermined maximum period of time during which a predetermined number of games are available for playing. The predetermined number of games comprises winning games, each offering a prize, and non-winning games offering no prize. Each of the predetermined number of games is randomly associated with a virtual game ticket 174 selected from an equal number of pre-generated virtual game tickets 174 stored in a registry on the game terminal 105 or an associated server in communication with the computer network, such as an application server 165. Data associated with a game ticket 174 determines whether a generated game will offer a prize or not. Each game ticket 174 will be played only once and by only one player, thus each virtual game ticket 174 in the limited pool of pre-generated game tickets 178 produces a single-use virtual game.

In order to facilitate generation of game tickets 174, the game play terminal 105 may include a program or software 155 for generating a random data stream comprising a finite series of outcomes, i.e., "offer" or "non-offers" O1 - - - On (e.g., - - - offer a prize of $1, non-offer, non-offer, non-offer, offer prize of $5, non-offer, offer prize of $2 . . . ect.). The system 100 pre-generates the number of offer type and non-offer type game tickets 174 according to certain criteria. For example, where the game is a game of chance, the aggregate of all offers/non-offers in any random prize data stream may be a predetermined percentage of all "tickets" represented by the outcomes in the random prize data stream. However, the game tickets 174 may be generated contemporaneous with or simultaneous to a request by a participant to participate in game play.

Each virtual game ticket 174 comprises data identifying an offer type 176, i.e. an "offer" or a "non-offer," and if the game ticket 174 is an "offer" the game ticket 174 further comprises a prize type 178. The offer type 176 pre-determines whether the game played will provide an offer for a prize, and the prize type 178 determines the type of offered prize selected from a number of tiers of prizes available for association with "offer" type game tickets 174. A prize type 176 may be, for example, a product, a service, a monetary sum, a discount, a promotional offer, a gift certificate or an affinity coupon. The game system 100 further may parse each prize type 178 into tiers according to value. The game play session may comprise a certain number of offerings of each prize type 178 and a certain number of prize types 178 in each value tier. For example, only one automobile may be available for winning but 10 gift certificates worth $100 each may be available for offering. A participant offered a $100 gift certificate may forgo accepting that prize in hopes of winning the single automobile prize. The game system 100 thereby encourages participants to play virtual games repeatedly during a game session by offering prizes regularly and requiring participants to make choices whether to accept prizes and be locked out or whether to continue playing. The game system 100 offers prizes regularly, for example at a rate of one in three games played, and at a higher rate than most online games. This is achievable because participants will accept a prize only when they are willing to forgo accepting any other prize and/or forgo playing any additional games for a temporal lock out period. This means that participants will not accept every offered prize, and, therefore, participants will not deplete the pool of prizes rapidly.

The type of game selected during a game play session determines how "offer" and "non-offer" virtual game tickets are displayed to a participant over the course of a game. Each game type, whether a game of skill or a game of chance, is represented by a game template 180. In one embodiment, the plurality of game templates 180 exists on the memory portion 150 of the game terminal 105. In another embodiment, a plurality of game templates 180 may exist in a database server 160 in communication with the game terminal 105 and/or application server 165 or the plurality of game templates 180 may exist in a database retained on an application server 165. When a participant requests a game, the software 155 instructs the CPU 145 to select the game template 180 representing the requested game from the plurality of game tickets 180 stored on the game terminal 105 or a server associated therewith, such as the application server 165.

Figure 3:
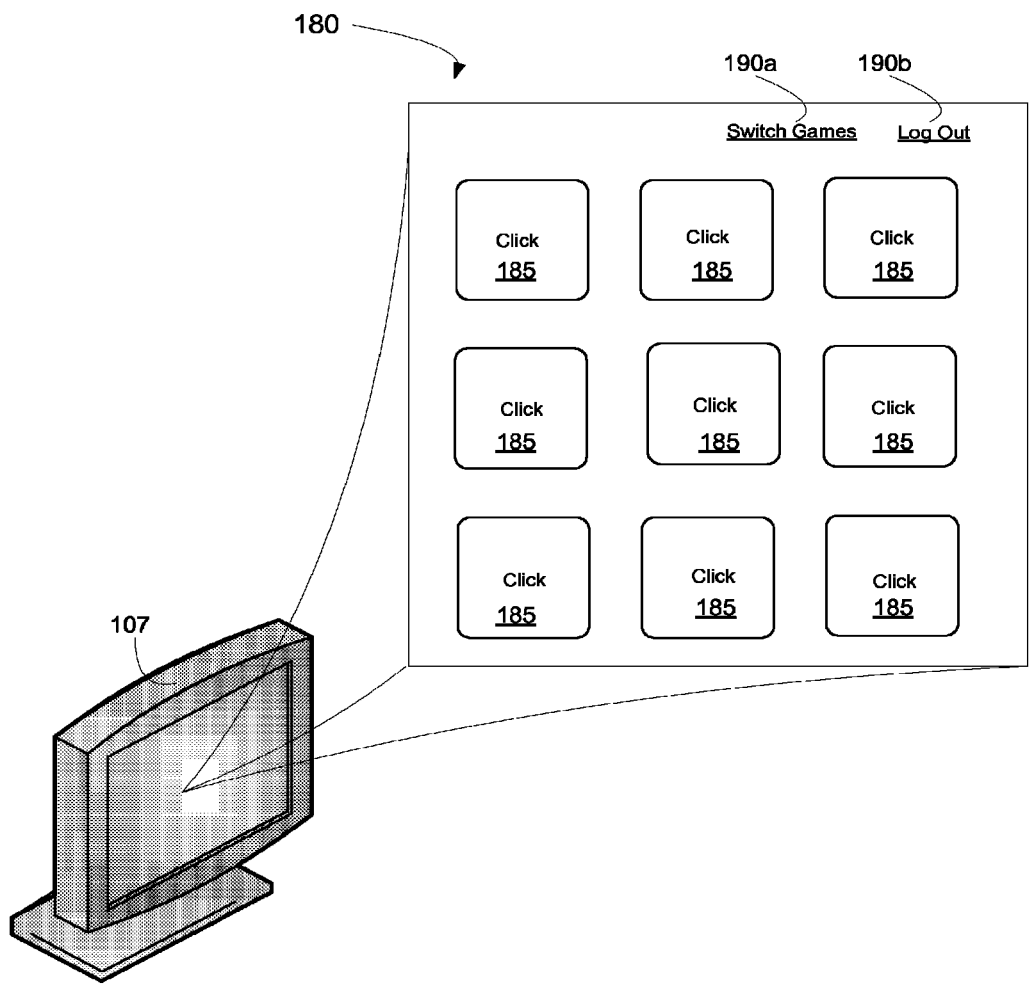
FIG. 3 depicts an embodiment of a virtual interactive game displayed on a GUI according to one embodiment of the present invention.

The game template 180 comprises a plurality of game elements 185 and one or more optional interactive links 190a, 190b, as depicted in the embodiment of FIG. 3. A game template 180 thereby depicts a layout for populating game elements 185 and optional interactive links 190a, 190b on a GUI of a user terminal 107. The game elements 185 may comprise, for example, one or more symbols, images, and/or text representing offered prizes and/or one or more symbols, images, and/or text representing potential future prizes not currently offered. By appearing during the game and as an integrated part of the interactive virtual game, impressions of non-offered prizes raise awareness about the product or service represented by the non-offered prize and indicate to a participant the products or services that may appear as prizes in subsequent games generated during the game play session. The template 180 displays these non-offered prizes in a manner such that the participant readily distinguishes the non-offered prize from an offered prize. The game elements 185 may or may not comprise branded advertising impressions. Some embodiments of the present invention may comprise generating virtual games bearing no branded advertising elements, and in those embodiments, the underlying functionality of user decision making and temporal lock out periods would remain unchanged. In embodiments comprising branded advertising impressions, the high volume incentivized game play achieves a desirable result. Because the advertising impressions are integrated as game elements 185, a participant acknowledges those elements instead of viewing the branded advertisement elements as distracting to the focus of playing a virtual game.

Figure 4A:
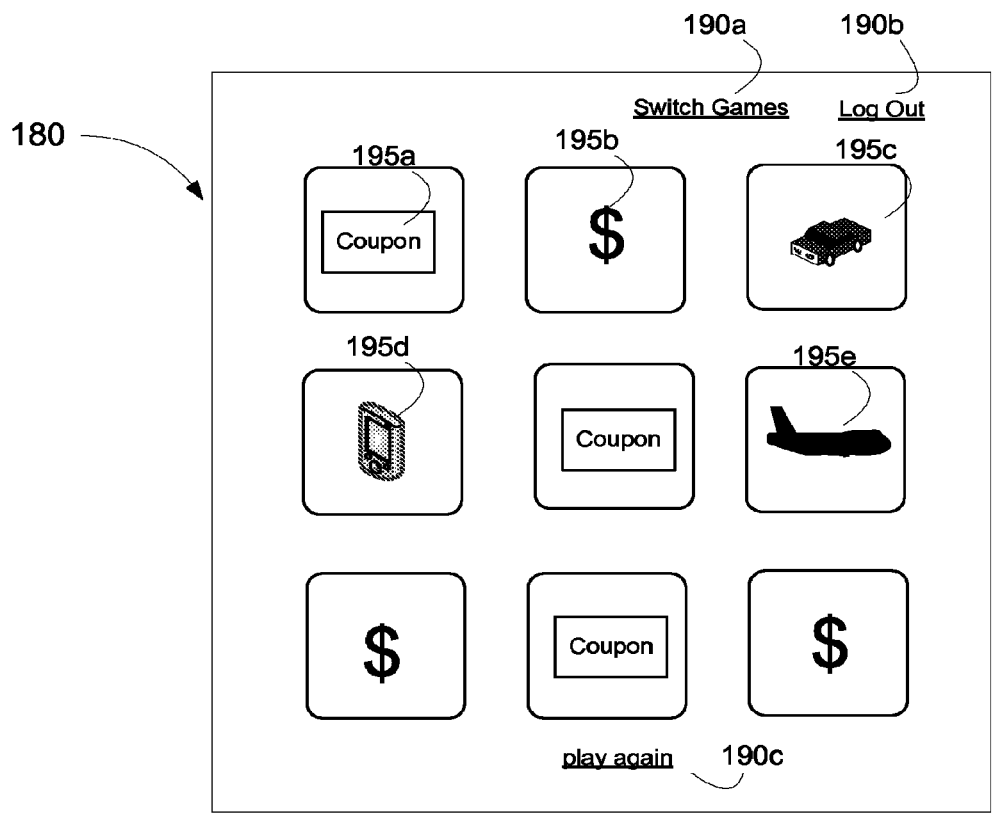
FIG. 4A depicts an embodiment of a virtual interactive game displayed on a GUI according to one embodiment of the present invention.
Figure 4B:
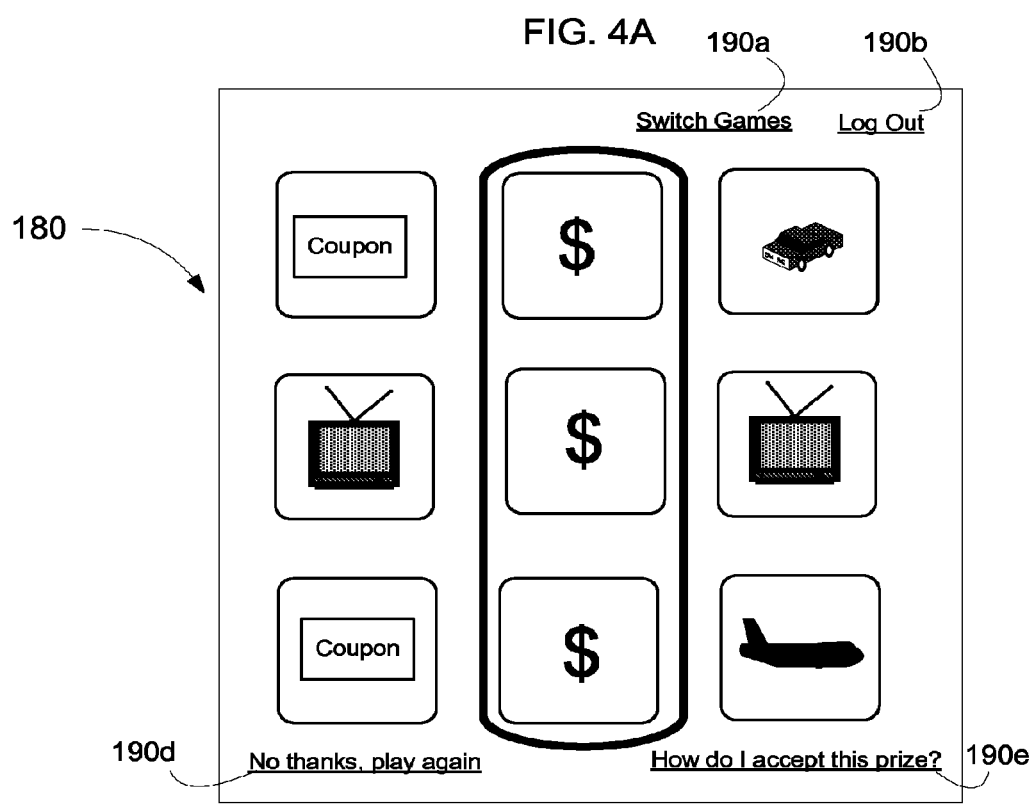
FIG. 4B depicts an embodiment of a virtual interactive game displayed on a GUI according to one embodiment of the present invention.

In the embodiment of FIG. 3, the virtual game is a tic-tac-toe style game of chance and the game elements 185 on the game template 180 are distributed in a 3×3 grid displayable on a GUI of a user terminal 107 along with interactive links 190a, 190b, that enable a participant to elect switching games or discontinuing play. In this embodiment the game elements 180 are interactive so that a participant may select three adjacent squares in an attempt to win the game and receive an offer for a prize pre-associated therewith. In another embodiment, such as that of FIG. 4A, the grid is fully revealed on the GUI display to the participant without requiring any additional interaction. This type of display increases the number of displayed impressions of a branded mark, product, and/or service. The participant here is presented with selectable links 190a, 190b, 190c for switching to another game template 180 (e.g. switching from tic-tac-to to a slot machine game), paying the same game template 180 again, or discontinuing play by logging out of the game play session, for example. In the embodiment of FIG. 4B, as the participant interacts with the GUI and clicks on the game elements 185 in the generated game based on the game template 180, prize images 195 appear. For a virtual game template 180 paired with an "offer" type virtual game ticket 178 during generation of a virtual game, revealing cells one at a time ultimately results in displaying three identical prize images 195 in a row (down, across or diagonal). The remaining cells will show different non-offer prize images 195. For a virtual game template 180 paired with a "non-offer" type virtual game ticket 178 during generation of a virtual game, revealing all cells will not result in three prize images 195 in a row thus indicating a losing game.

In another embodiment (not shown), a slot machine game associated with an "offer" type game ticket 174 will display a prize image 195 of an offered prize of the pre-determined prize type 178 in each of game elements 185 representing the three squares in the middle row of a virtual slot machine. Other prize images 195 comprising one or more prize types 178 may appear in the rows above and below the "offer" row. In another embodiment (not shown), a slot machine game associated with a "non-offer" type game ticket 174 will display multiple non-offered prize images 195 in a pattern indicative of a losing combination (e.g. prize A, prize A, prize B).

Each game played is a single-use game randomly associated with a single-use game ticket 174 that predetermines the prize offering outcome. Additionally, the number of "offer" type game tickets 174 and "non-offer" type game tickets 178 pre-generated for a game play session, such as a sweepstakes period, is predetermined according to one or more criteria registered and stored in the memory portion 150. The criteria may be determined by the host of the game terminal 105, by the advertisers sponsoring prize offerings or by some combination of the two. In one embodiment, advertisers pay the entity owning the game terminal 105 for incorporating a pre-selected number of branded advertising impressions and/or click throughs or purchases associated with those impressions.

One criterion for pre-generating a group of virtual game tickets 178 is an estimated number of plays for a game session. Prize images 195 associated with sponsored prizes are stored, for example, in a registry on an advertiser database server (not shown), or on an existing database server 160, or on the memory portion 150 of the game terminal 105. The advertiser registry allows advertisers to interact with the game terminal 105 and purchase a number of impressions of each prize type 178 and prize value tier. For example, a game session may span a 24 hour period during which an estimated 1 million participants will play virtual games for 15 minutes each. If, on average, a virtual game is played four times in one minute, each participant will consume, or play, 60 game tickets 178. Therefore, the game system 100 will need to generate at least 60 million game tickets 178. The estimated number of virtual games played may be based on history, trends, marketing events, intended and unintended publicity, day of the week, holidays, daily increase in play, and/or national sporting events. The game system 100 may track continuously participation rates to further refine the estimated number of plays and variables associated with that estimation.

For a game session, the predetermined number of "offer" type and "non-offer" type game tickets 178 may depend on a maximum number of prizes that can be accepted. Each prize type 178 will comprise a specific quantity of prizes available for distribution to participants accepting prize offers. Once participants accept the maximum number of prizes for prize type 178, the software 155 instructs the game system 100 to remove all remaining "offer" type game tickets 178 comprising a call for that prize type 178 from the queue of pre-generated game tickets 178. Those removed game tickets 178 no longer will be available for pairing with game templates 180 during the generation of a virtual game.

For a game session, the predetermined number of "offer" type and "non-offer" type game tickets 178 may depend on a claim probability per prize type 178. A "claim probability" is the number of times a participant accepts an offered prize type 178 divided by the number of times the system 100 offers that prize type 178. For example, a discount of "$20 off of $100 spent at Electronics Megastore" might have a claim probability of two percent while an MP3 player might have a claim probability of ninety eight percent because more participants offered an MP3 player will want to accept that prize.

The game terminal 105 may then calculate a number of "offer" type game tickets 174 per prize type 178 offered by an advertiser or a sponsor. This calculated number is equal to the maximum number of a prize type 178 provided by an advertiser or a sponsor divided by the "claim probability," or the probability of a participant choosing to claim that prize type 178. For example, if Electronics Megastore provided 100 discount prize types 178 of "$20 off of $100 spent at Electronics Megastore," the number of winning game tickets 174 presenting this prize type 178 would be one hundred (100) divided by two (2) percent. Because that offered discount prize is only accepted two percent of the time, the game system 100 can offer this prize type 178 five thousand (5000) times. If an MP3 manufacturer provided 5 MP3 players, the number of winning game tickets for the MP3 player would be five (5) divided by ninety eight (98) percent, or approximately five (5). Because this is a more highly desired prize type 178, participants accept this product with at a nearly 1:1 offer to acceptance ratio.

For a game session, the predetermined number of "offer" type and "non-offer" type game tickets 174 may depend on a desired offer rate. The "offer rate" is the percentage of game tickets 178 that are "offer" type game tickets 178. This rate determines how often a participant will receive an offer while playing virtual games during a game session. Additionally, for a game session, the predetermined number of "offer" type and "non-offer" type game tickets 174 may depend on a total number of offers. The number of "offer" type virtual game tickets 174 needed to fulfill a game play session is the estimated number of games played multiplied by the offer rate. Conversely, the system 100 may calculate the offer rate based on the total number of offers divided by the estimated number of virtual games played during a game session.

In still another embodiment (not shown) the game may be a game of skill such as a computer-based simulated golf game. In such an embodiment a participant provides one or more input parameters (e.g., a speed and angle associated with a swing of a simulated golf club), and a trajectory is calculated for a simulated golf ball based on the input parameters. In the event that it is determined, preferably by the game terminal 105, that the participant was successful, a game ticket 174 that is a winning game ticket 174, i.e., an offer is either generated or pulled from the queue of previously generated game play tickets 174, and the participant is offered a prize. The participant may choose to accept the offer, whereby the participant is subjected to a temporal lock out.

Figure 5:
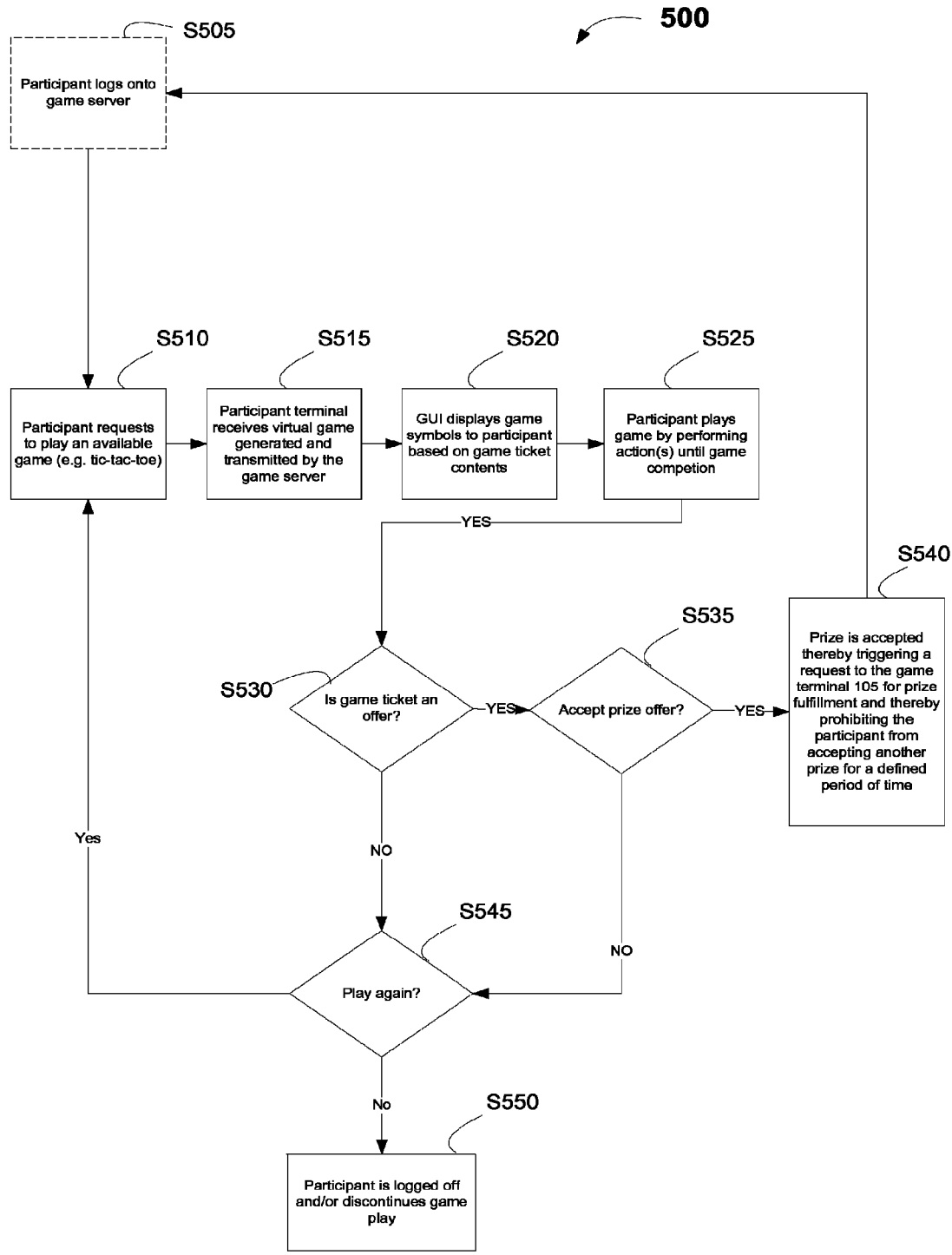
FIG. 5 depicts a method of use of an embodiment of the system of the present invention.

Once the game terminal 105 predetermines a number of "offer" type and "non-offer" type game tickets 174 for a game session and generates those game tickets 174, one or more participants may interact with the game system 100 to play interactive, prize-incentivized virtual games. FIG. 5 depicts an embodiment of such interactive game play. In embodiments requiring participants to register identification information, a log on step S505 initiates game play. At a request step S510, a participant places a request to the game terminal 105 from a participant terminal 107 communicating with the game terminal 105 via a computer network, such as the Internet 130. At a receipt step S515, the participant terminal 107 receives a virtual game generated and transmitted by the game terminal 105. During generation of a virtual game, the software 155 pairs a selected game template 180 with a single-use game ticket 174 that pre-determines whether the virtual game will be an "offer" type game that offers a prize of a pre-determined prize type 178, or a "non-offer" type game. At a display step S520, the GUI displays the virtual game comprising game elements 185 such as branded advertisements, text, and/or symbols. At a play step S525, a participant interacts with the GUI display of the virtual game, performing any steps required to complete that instance of game play. A first consideration step S530 reviews whether the single-use game ticket 174 associated with the instance of virtual game play is an "offer" type or a "non-offer" type. If the game ticket 174 instructs the virtual game template 180 to display a prize image 195 of an offered prize at the GUI, the participant must decided at a second consideration step S535 whether to accept or decline the offered prize.

If the participant accepts the offered prize at an acceptance step S540, an acceptance datum is transmitted the game server so that prize fulfillment occurs and, more importantly, so that the game system 100 prohibits the participant from at least accepting another prize for a pre-determined lockout period. Following the lock out period associated with the acceptance step S540, a participant may accept another prize during subsequent rounds of game play. In one embodiment, the temporal lock out may prohibit a participant from engaging in subsequent rounds of game play. In a preferred embodiment, the participant may continue playing virtual games while the software 155 on the game terminal 105 continuously declines any offered prizes automatically until the end of the lockout period. In this latter embodiment, the participant may practice at games of skill and, in embodiments wherein game elements 185 comprise branded advertising, the participant will receive exposure to an increased volume of branded advertising elements.

A similar high volume exposure rate exists if the participant declines an offered prize at the second consideration step S535 or if the game ticket 174 associated with the instance of game play is a "non-offer" type. In either case, the participant may opt to play again at a third consideration step S545, thereby generating another virtual game from a game template 180 associated with a pre-generated virtual game ticket 178. In embodiments wherein game elements 185 comprise branded advertising impressions, the participant electing to play again in lieu of accepting an offered prize receives increased exposure to those advertising impressions. Instead of playing again, the participant may opt to discontinue play at an end step S550, which may require logging off of the game play server or game terminal 105 in embodiments requiring a participant to register and log in to play. In one embodiment, the selectable options available to a participant at the second consideration step S535 and third consideration step S545 are presented by the virtual game template 180 as selectable hyperlinks, such as the selectable links 190a-190e presented in the game embodiment depicted in FIGS. 4A and 4B.

In those embodiments in which the game of the present invention is used as a means of branded advertising, the prizes awarded to participants may be provided by advertisers. As used herein, the term "advertiser" is used in the broadest sense to mean any individual, business entity or other organization that wishes to advertise their respective services and/or products by way of the system 100 and includes both advertising agencies and entities who are advertising their goods and/or services. Advertisers interested in making use of this system provide prizes and/or pay to have their product displayed in connection with the game. In one embodiment an advertiser registers identification information with the system and receives a unique advertiser ID and password. If the advertiser wishes to advertise its products by having its products offered as prizes or otherwise associated with a game, it first signs in to the registry stored on the game terminal 105, fore example, by entering its unique advertiser ID and password. The advertiser is then provided options as to the games that are available and with which an advertiser may to associate its products.

Where game play is conducted in connection with branded advertising an advertiser may obtain real-time information regarding participant preferences and may adjust prize offerings in current or subsequent game sessions based upon those preferences. Furthermore, an advertiser may access the system at any time via the advertiser registry to monitor game play, retrieve data regarding its prizes, or modify the presentation of its advertised products.

Following initial registration, an advertiser may manage product enrollment through the advertiser registry. An advertiser may operate at an advertiser terminal (not shown), which may comprise a personal computer running a web browser that establishes a secure connection through the computer network with the advertiser registry on the game system 100. Another embodiment of the advertiser terminal might comprise a personal computer running a software application locally that enables management of the advertiser's products. The software application transmits, either dynamically or based on a command, the choices made by the advertiser to the advertiser registry. The advertiser terminal also has the capability to dynamically communicate with the advertiser registry so that the advertiser may monitor game play, retrieve data regarding its prizes, or modify the presentation of its advertised products in real time.

Not every embodiment requires the presentation of branded advertising impressions, but the high volume nature and accessibility of virtual interactive games provides an unparalleled medium for engaging targeted participants with branded advertising. Standard sweepstakes and lottery games are incapable of achieving the activity volumes and high-percentage prize offerings of incentivized virtual game play. Furthermore, existing "real world" sweepstakes and lottery games are limited to presenting only a small percentage of winning game tickets because the participant winning a prize automatically must accept that prize. The present invention enables a participant to decline an offered prize in hopes of acquiring a more desirable prize. In embodiments of the present invention incorporating branded advertising impressions, the game system 100 is capable of collecting relative valuation data which is highly valued by advertisers. By collecting and analyzing participant decisions and participant characteristics and demographics as well as other variables, such as time of day, day of week, etc. that offered prizes are accepted, the game system 100 can provide advertising companies and companies advertising their brand of products with valuable feedback on the desirability of their products and services. Participant data may be sent from the advertiser registry to the advertiser terminal for further analysis. Based upon the participant information the advertiser may choose to alter or amend its prize offerings. In the event that the advertiser chooses to alter or amend its prize offerings it may do so by communicating with the advertiser registry. For example, an advertiser may test several different prize presentations, including various groups of bundled prizes, in order to understand which of the various presentations has the highest acceptance rate.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A computer implemented method for delivering offers having an associated temporal lockout, the method comprising:
   communicating, by a computer system, an offer having an associated temporal lockout to a participant terminal;
   causing the participant terminal to display to a participant an option to accept the offer having the associated temporal lockout and an option to decline the offer; and
   responsive to selection of the option to accept the offer, executing a temporal lockout whereby the participant is subject to a lockout period during which the computer system prevents the participant from fulfilling subsequent offers during the lockout period.

2. The method according to claim 1, wherein the act of causing the participant terminal to display to the participant the option to accept the offer and the option to decline the offer, includes an act of causing the participant terminal to display at least one other offer having a respective temporal lockout.

3. The method according to claim 1, further comprising an act of collecting, by the computer system, preference data responsive to participant selection of the option to decline the offer.

4. The method according to claim 1, further comprising an act of accepting, by the computer system, a request from the participant for a shorter lockout period.

5. The method according to claim 4, further comprising an act of automatically accepting or rejecting the request for the shorter lockout period.

6. The method according to claim 1, further comprising an act of terminating the temporal lockout early in response to the player taking an action.

7. The method according to claim 1, wherein responsive to selection of the option to decline the offer, the system is configured not to execute a temporal lockout associated with the offer, and permit the participant to accept subsequent offers.

8. The method according to claim 1, further comprising an act of generating, by the computer system, offers with associated lockouts in accordance with a pre-selected offer rate.

9. The method according to claim 1, further comprising an act of assigning, by the computer system, one or more offers to offer tiers having respective lockout periods according to offer type.

10. The method according to claim 1, further comprising an act of storing, by the computer system, data elements in a participant registry that prevents a participant from fulfilling another offer for a predetermined period of time following acceptance of the offer.

11. A system for delivering offers having an associated temporal lockout, the system comprising:
    at least one processor operatively connected to a memory, the at least one processor when executing is configured to:
    communicate an offer having an associated temporal lockout to a participant terminal;
    receive from the participant terminal information on a participant selection of one of either an option to accept the offer or an option to decline the offer; and
    responsive to the information indicating a selection of the option to accept the offer, executing a temporal lockout whereby the participant is subject to a lockout period during which the participant is prevented from fulfilling subsequent offers during the lockout period.

12. The system according to claim 11, wherein communicating the offer to the participant terminal, includes communicating at least one other offer having a respective temporal lockout for display to the participant.

13. The system according to claim 11, wherein the at least one processor is configured to collect preference data responsive to participant selection of the option to decline the offer.

14. The system according to claim 11, wherein the at least one processor is configured to accept a request for a shorter lockout period from the participant.

15. The system according to claim 11, wherein the at least one processor is configured to automatically accept or reject the request for the shorter lockout period.

16. The system according to claim 1, wherein the at least one processor is configured to terminate the temporal lockout early in response to the player taking an action.

17. The system according to claim 11, wherein the at least one processor is configured to not to execute a temporal lockout associated with the offer responsive to selection of the option to decline the offer, and permit the participant to accept subsequent offers.

18. The system according to claim 11, wherein the at least one processor is configured to generate offers with associated offers in accordance with a pre-selected offer rate.

19. The system according to claim 11, wherein the at least one processor is configured to assign one or more offers to offer tiers having respective lockout periods according to offer type.

20. A computer implemented method for delivering offers having an associated temporal lockout, the method comprising:
    communicating, by a computer system, an offer to a participant terminal and a restriction associated with the offer specifying a limitation on acceptance of subsequent offers;
    causing the participant terminal to display to a participant an option to accept the offer and an option to decline the offer;
    wherein the act of causing the participant terminal to display to the participant the option to accept the offer and the option to decline the offer, includes an act of causing the participant terminal to display additional potential offers and associated temporal lockouts; and
    responsive to selection of the option to accept any offer, executing a temporal lockout whereby the participant is subject to a lockout period during which the computer system prevents the participant from fulfilling any other offers during the lockout period.

* * * * *